United States Patent
Chen

(10) Patent No.: US 10,990,825 B2
(45) Date of Patent: Apr. 27, 2021

(54) IMAGE PROCESSING METHOD, ELECTRONIC DEVICE AND COMPUTER READABLE STORAGE MEDIUM

(71) Applicant: Guangdong OPPO Mobile Telecommunications Corp., Ltd., Guangdong (CN)

(72) Inventor: Yan Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 82 days.

(21) Appl. No.: 16/249,515

(22) Filed: Jan. 16, 2019

(65) Prior Publication Data

US 2019/0377949 A1 Dec. 12, 2019

(30) Foreign Application Priority Data

Jun. 8, 2018 (CN) .......................... 201810586637.1

(51) Int. Cl.
| G06K 9/00 | (2006.01) |
| G06K 9/46 | (2006.01) |
| G06K 9/62 | (2006.01) |

(52) U.S. Cl.
CPC ....... *G06K 9/00684* (2013.01); *G06K 9/4604* (2013.01); *G06K 9/6256* (2013.01); *G06K 9/6262* (2013.01)

(58) Field of Classification Search
CPC ............. G06K 9/00684; G06K 9/4604; G06K 9/6256; G06K 9/6262; G06K 9/6267; G06K 9/00664; G06N 3/0454
See application file for complete search history.

(56) References Cited

U.S. PATENT DOCUMENTS

| 6,456,899 | B1 * | 9/2002 | Gleason | G03F 7/7065 |
| | | | | 700/110 |
| 9,576,201 | B2 | 2/2017 | Wu et al. | |
| (Continued) | | | | |

FOREIGN PATENT DOCUMENTS

| CN | 103914702 A | 7/2014 |
| CN | 107292229 A | 10/2017 |
| (Continued) | | |

OTHER PUBLICATIONS

Extended European Search Report issued in corresponding European application No. 19152272.1 dated Jul. 19, 2019.

(Continued)

*Primary Examiner* — Mazda Sabouri

(57) ABSTRACT

An image processing method, an electronic device and a computer readable storage medium are described. The image processing method may include: obtaining an image to be detected, and inputting the image to be detected to a neural network; detecting the image to be detected via the neural network to obtain confidence levels of image categories for a background image in the image and confidence levels of object categories for a foreground target in the image; determining an image category of the background image according to the confidence levels of the image categories for the background image and a confidence level threshold; and determining an object category of the foreground target according to the confidence levels of the object categories for the foreground target and the confidence level threshold.

18 Claims, 11 Drawing Sheets

(56) References Cited

U.S. PATENT DOCUMENTS

| | | | | |
|---|---|---|---|---|
| 2011/0243452 | A1* | 10/2011 | Sakaguchi | G06F 16/54 |
| | | | | 382/190 |
| 2011/0243529 | A1* | 10/2011 | Oryoji | G06F 16/7847 |
| | | | | 386/248 |
| 2018/0197223 | A1* | 7/2018 | Grossman | G06K 9/4619 |
| 2019/0005069 | A1* | 1/2019 | Filgueiras de Araujo | |
| | | | | G06K 9/4671 |
| 2019/0138810 | A1* | 5/2019 | Chen | G06Q 30/0242 |
| 2019/0361994 | A1* | 11/2019 | Shen | G06F 16/583 |

FOREIGN PATENT DOCUMENTS

| | | |
|---|---|---|
| CN | 107563387 A | 1/2018 |
| CN | 107622272 A | 1/2018 |
| CN | 107784315 A | 3/2018 |
| CN | 107871117 A | 4/2018 |
| WO | 2017007626 A1 | 1/2017 |

OTHER PUBLICATIONS

International search report issued in corresponding international application No. PCT/CN2019/089427 dated Sep. 18, 2019.
Sappy et al: "Inter-dependent CNNs for joint scene and object recognition", 2016 23rd International Conference on Pattern Recognition (ICPR), IEEE, Dec. 4, 2016 (Dec. 4, 2016), pp. 3386-3391, XP033086101, DOI: 10.1109/ICPR.2016.7900157.
Examination of EP Application 191522721 dated Jun. 16, 2020.
India Examination Report for IN Application 201914005103 dated Feb. 3, 2021.

* cited by examiner

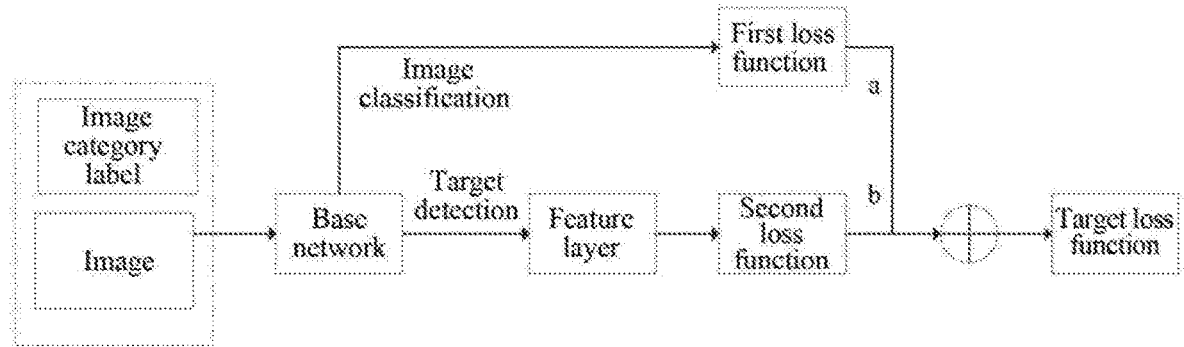

FIG. 4

```
┌─────────────────────────────────────────────────┐
│ Input a training image with an image category and an object │
│ category to a neural network, extract one or more features of the │
│ training image via a base layer, input the one or more extracted │
│ image features to a classification layer and a target detection │
│ layer to obtain a first loss function at the classification layer and │
│ a second loss function and a position loss function at the target │
│                      detection layer                       │
└─────────────────────────────────────────────────┘ ～ 501
                          │
                          ▼
┌─────────────────────────────────────────────────┐
│ Calculate a weighted summation of the first loss function, │
│  the second loss function and the position loss function │
│              to obtain a target loss function              │
└─────────────────────────────────────────────────┘ ～ 502
                          │
                          ▼
┌─────────────────────────────────────────────────┐
│ Adjust one or more parameters of the neural network to │
│ minimize the first loss function, the second loss function │
│            and the position loss function.             │
└─────────────────────────────────────────────────┘ ～ 503
```

FIG. 5

IMAGE PROCESSING METHOD, ELECTRONIC DEVICE AND COMPUTER READABLE STORAGE MEDIUM

CROSS-REFERENCE TO RELATED APPLICATION(S)

The present application claims priority to Chinese Patent Application No. 201810586637.1 filed on Jun. 8, 2018, the entire disclosure of which is hereby incorporated by reference.

TECHNICAL FIELD

The present disclosure relates to, but is not limited to, a computer application field, and in particular to an image processing method, an electronic device and a computer readable storage medium.

BACKGROUND

With the popularity of electronic devices such as mobile terminals, more and more users may use mobile terminals to shoot and record what they see. However, a traditional image processing technique can only recognize a category of an entire image, but cannot obtain more information.

SUMMARY

Implementations of the present disclosure provide an image processing method, an electronic device and a computer readable storage medium.

In one aspect, an image processing method is provided, which may include: obtaining an image to be detected, and inputting the image to be detected to a neural network; detecting the image to be detected via the neural network to obtain confidence levels of image categories for a background image in the image and confidence levels of object categories for a foreground target in the image; determining an image category of the background image according to the confidence levels of the image categories for the background image and a confidence level threshold; and determining an object category of the foreground target according to the confidence levels of the object categories for the foreground target and the confidence level threshold.

In another aspect, an electronic device is provided, which may include a processor and a memory storing a computer program that is executable by the processor to perform actions of: obtaining an image to be detected, and inputting the image to be detected to a neural network; detecting the image to be detected via the neural network to obtain confidence levels of image categories for a background image in the image and confidence levels of object categories for a foreground target in the image; determining an image category of the background image according to the confidence levels of the image categories for the background image and a confidence level threshold; and determining an object category of the foreground target according to the confidence levels of the object categories for the foreground target and the confidence level threshold.

In yet another aspect, a computer readable storage medium is provided, which may include computer program that is executable by a processor to perform actions of: obtaining an image to be detected, and inputting the image to be detected to a neural network; and detecting the image to be detected via the neural network to obtain confidence levels of image categories for a background image in the image and confidence levels of object categories for a foreground target in the image; determining an image category of the background image according to the confidence levels of the image categories for the background image and a confidence level threshold; and determining an object category of the foreground target according to the confidence levels of the object categories for the foreground target and the confidence level threshold.

A better understanding of the nature and advantages of implementations of the present disclosure may be gained with reference to the following detailed description and the accompanying drawings.

BRIEF DESCRIPTION OF DRAWINGS

The accompanying drawings are used to provide a further understanding of the technical solutions of the present disclosure and form a part of the specification, and together with the implementations of the disclosure, are intended to explain the technical solutions of the disclosure, but do not constitute a limitation on the technical solutions of the disclosure.

FIG. 4 is a schematic diagram of architecture of a neural network according to an exemplary implementation;

FIG. 5 is a flowchart of a method for training a neural network according to another exemplary implementation;

DETAILED DESCRIPTION

The present disclosure will be further described in details with reference to drawings and implementations. It should be understood that implementations described herein are only for the purpose of explaining the present disclosure, but not intended to limit the present disclosure.

Figure 1:
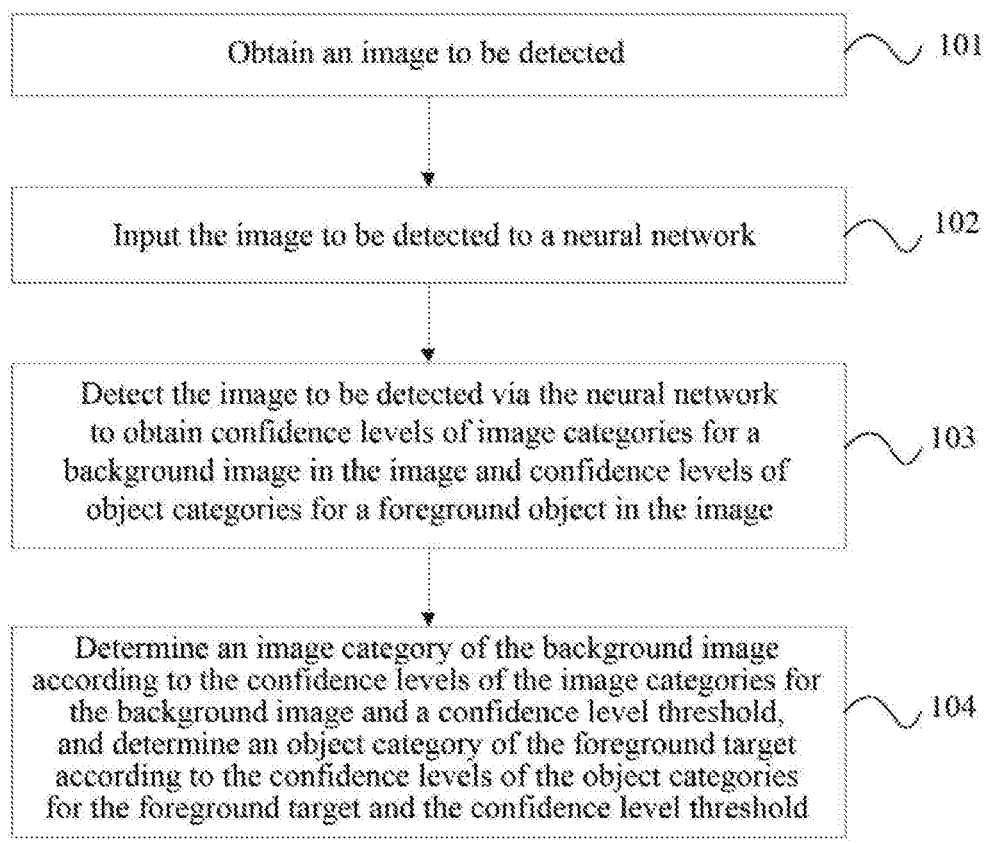
FIG. 1 is a flowchart of an image processing method according to an exemplary implementation.

FIG. 1 is a flowchart of an image processing method according to an exemplary implementation. As shown in FIG. 1, the exemplary implementation provides an image processing method, which may include actions 101-104.

In action 101, an image to be detected is obtained.

In action 102, the image to be detected is input to a neural network.

In action 103, the image to be detected is detected via the neural network to obtain confidence levels of image categories for a background image in the image to be detected and confidence levels of object categories for a foreground target in the image to be detected.

In action 104, an image category of the background image is determined according to the confidence levels of the image categories for the background image and a confidence level threshold, and an object category of the foreground target is determined according to the confidence levels of the object categories for the foreground target and the confidence level threshold.

The image processing method provided by the implementation can simultaneously detect the background image and the foreground target, thereby obtaining more image information and improving detection efficiency.

The image to be detected may be any image, such as an image downloaded from a network, or an image in a local album of a mobile terminal or a shot image.

The image categories may refer to categories of pre-defined image classifications. For example, the categories of image classifications may include scenery, beach, snow-covered landscape, blue sky, green space, night view, darkness, shadow, sunrise/sunset, indoor, fireworks, spotlight, etc. The object categories may refer to predefined categories of the target in the image. For example, the object categories may include portrait, baby, cat, dog, food, etc. In addition, the image categories and the object categories may also include text document, microspur, etc.

In statistics, a confidence interval of a probability sample is interval estimate of a population parameter of the probability sample. And the confidence interval represents the degree to which the probability of the true value of the population parameter falls around the measurement result. The confidence level is the confidence degree of the measure value of the measured parameter.

In an exemplary implementation, the neural network may include at least one input layer, at least one base layer, at least one classification layer, and at least one target detection layer. The input layer is cascaded to the base layer, and the base layer is cascaded to the classification layer and the target detection layer. The base layer may be a base network, the classification layer may be a classification network, and the target detection layer may be a target detection network.

In action 102, the image to be detected may be input to the input layer of the neural network;

In action 103, one or more features of the image to be detected are extracted via the base layer of the neural network, the one or more extracted image features are input to the classification layer and the target detection layer. The confidence levels of the image categories for the background image are obtained by classification detection at the classification layer, the confidence levels of the object categories for the foreground target are obtained via target detection at the target detection layer.

In an exemplary implementation, the neural network may also include a first output layer and a second output layer, the first output layer is cascaded to the classification layer, and the second output layer is cascaded to the target detection layer. The first output layer may be configured to output the confidence levels of the image categories for the background image, and the second output layer may be configured to output the confidence levels of the object categories for the foreground target.

In an exemplary implementation, the image processing method may further include inputting a training image pre-labeled with an image category and an object category to the neural network to train the neural network.

The neural network may be trained before the action 102, so that the trained neural network can simultaneously detect background image and the foreground target. Then, the trained neural network can be used in actions 102 and 103 to obtain more image information and improve the recognition efficiency.

In an exemplary implementation, inputting a training image pre-labeled with an image category and an object category to the neural network to train the neural network may include: inputting the training image to the input layer of the neural network; extracting one or more features via the base layer, and inputting the one or more extracted image features to the classification layer and the target detection layer; obtaining a first loss function at the classification layer, wherein the first loss function indicates a difference between a first predicted confidence level and a first true confidence level; wherein the first predicted confidence level is a confidence level, which is predicted by the neural network, of an image category of a background image in the training image, and the first true confidence level refers to a true confidence level of the image category pre-labeled in the training image; obtaining a second loss function at the target detection layer, wherein the second loss function indicates a difference between a second predicted confidence level and a second true confidence level; the second predicted confidence level is a confidence level, which is predicted by the neural network, of an object category of a foreground target in the training image, and the second true confidence level refers to a true confidence level of the object category pre-labeled in the training image; calculating a weighted summation of the first loss function and the second loss function to obtain a target loss function; adjusting one or more parameters of the neural network according to the target loss function to minimize the first loss function and the second loss function.

In an exemplary implementation, the neural network may include also a first output layer and a second output layer, the first output layer is cascaded to the classification layer, and the second output layer is cascaded to the target detection layer. The first output layer is configured to output confidence levels of image categories for a background image, and the second output layer is configured to output confidence levels of object categories for a foreground target and offset parameters of each pre-selected default boundary box relative to a true boundary box of each object category of the foreground target.

In an exemplary implementation, the image processing method may further include: performing target detection via the target detection layer to obtain a position of the foreground target in the image. The position of the foreground target may be represent by coordinates of a boundary box (e.g., a rectangular box) corresponding to the foreground target in a coordinate system of the image. The neural network may be trained before being used to detect the image to be detected, so that the trained neural network can simultaneously detect the image category of the background image, the object category of the foreground target, and the position of the foreground target. Then, the trained neural network can be used to process the image to obtain more image information and improve the recognition efficiency.

In an exemplary implementation, the image processing method may further include inputting a training image pre-labeled with an image category, an object category, and a true boundary box corresponding to the object category to the neural network to train the neural network.

In an exemplary implementation, inputting a training image pre-labeled with an image category, an object category, and a true boundary box corresponding to the object category to the neural network to train the neural network may include: inputting the training image to an input layer of the neural network; extracting one or more features via the base layer, and inputting the one or more image features to the classification layer and the target detection layer; obtaining a first loss function at the classification layer, wherein the first loss function indicates a difference between a first predicted confidence level and a first true confidence level; the first predicted confidence level is a confidence level, which is predicted by the neural network, of an image category of a background image in the training image, and the first true confidence level represents a confidence level of the image category pre-labeled in the training image; obtaining a second loss function and a position loss function at the target detection layer, wherein the second loss function indicates a difference between a second predicted confidence level and a second true confidence level, the second predicted confidence level is a confidence level, which is predicted by the neural network, of an object category of a foreground target in the training image, and the second true confidence level is a true confidence level of the object category pre-labeled in the training image, and the position loss function is constructed according to offset parameters of each pre-selected default boundary box relative to the true boundary box corresponding to the object category; calculating a weighted summation of the first loss function, the second loss function and the position loss function to obtain a target loss function; adjusting one or more parameters of the neural network according to the target loss function to minimize the first loss function, the second loss function and the position loss function.

In an exemplary implementation, the offset parameters of each pre-selected default boundary box relative to the true boundary box corresponding to the object category may include: coordinates of a center point of the default boundary box, a width offset of the default boundary box relative to the true boundary box, and a height offset of the default boundary box relative to the true boundary box. The offset parameters may indicate an error between the pre-selected default boundary box relative to the true boundary box.

In an exemplary implementation, the base layer may include a Visual Geometry Group (VGG) layer, the classification layer may include a Mobilenet layer, the target detection layer may include a Single Shot MultiBox Detector (SSD) layer, and the first output layer and the second output layer may respectively include a softmax classifier.

In an exemplary implementation, a confidence level of each image category for the background image in the image to be detected can be obtained via the detection of the neural network, the detected confidence level of each image category is compared with the confidence level threshold, and an image category of which a confidence level is highest and greater than the confidence level threshold is selected as an image category of the background image. For example, the neural network detects confidence levels of three image categories (e.g., scenery, beach, sunrise) for the background image, and an image category (e.g., beach) of which the confidence level is highest and greater than the confidence level threshold is selected as the image category of the background image.

In an exemplary implementation, a confidence level of each object category for the foreground target in the image to be detected may be obtained via the detection of the neural network, the detected confidence level of each object category is compared with the confidence level threshold, and an object category of which the confidence level is highest and greater than the confidence level threshold is selected as an object category of the foreground target. For example, confidence levels of two object categories (e.g. portrait, baby) for the foreground target are detected via the neural network, and an object category (e.g. baby) of which the confidence level is highest and greater than the confidence level threshold is selected as an object category of the foreground target.

In an exemplary implementation, before action 102, the image processing method may further include: constructing a neural network containing a first branch and a second branch. The first branch is configured to output confidence levels, which are detected by the neural network, of the image categories for the background image; the second branch is configured to output confidence levels, which are detected by the neural network, of the object categories for the foreground target, or the second branch is configured to output confidence levels, which are detected by the neural network, of the object categories for the foreground target and offset parameters, which are detected by the neural network, of each pre-selected default boundary box relative to a true boundary box corresponding to each object category.

The neural network used in image processing method and the training process of the neural network will be illustratively described below.

Figure 2:
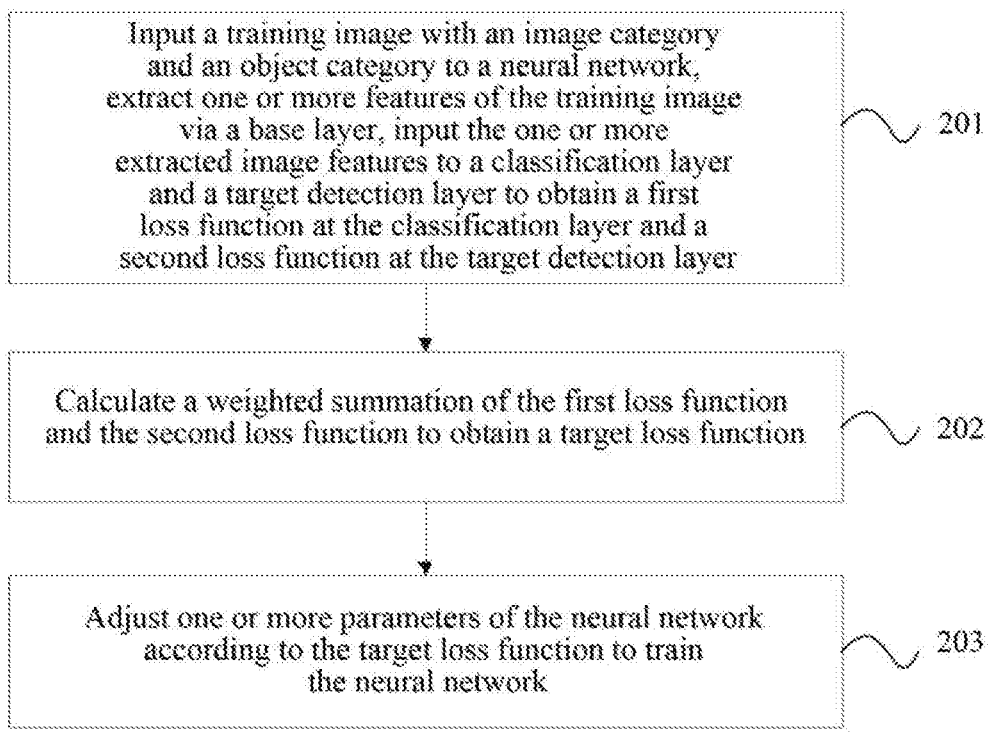
FIG. 2 is a flowchart of a method for training a neural network according to an exemplary implementation.

FIG. 2 is a flowchart of a method for training a neural network according to an exemplary implementation. As shown in FIG. 2, the method may include actions 201, 202 and 203.

In action 201: a training image with an image category and an object category is input to a neural network, one or more features of the training image are extracted via a base layer of the neural network, the one or more extracted image features are input to a classification layer and a target detection layer. Then a first loss function is obtained at the classification layer, the first loss function indicates a difference between a first predicted confidence level and a first true confidence level of the image category of the background image in the training image, and a second loss function is obtained at the target detection layer, the second loss function indicates a difference between a second predicted confidence level and a second true confidence level of the object category of the foreground target in the training image.

Image categories may refer to categories of predefined image classifications. For example, the categories of the image classifications may include scenery, beach, snow-covered landscape, blue sky, green space, night view, darkness, shadow, sunrise/sunset, indoor, fireworks, spotlight, etc. Object categories may refer to predefined categories of targets in images. The categories of targets may include portrait, baby, cat, dog, gourmet, etc. The categories of the image classifications and the object categories may also include a text document, microspur, etc.

In statistics, the confidence interval of a probability sample is interval estimate of a population parameter of the probability sample. The confidence interval represents the degree to which the probability of the true value of the population parameter falls around the measurement result. The confidence level is the confidence degree of the measure value of the measured parameter.

In an exemplary implementation, the neural network may include an input layer, a base layer, a classification layer, a target detection layer, and an output layer. The input layer is cascaded to the base layer. The training image is received at the input layer and passed to the base layer.

The layers included in the neural network in the exemplary implementation will be described below.

The base layer is used to extract one or more features of the input training image to obtain one or more image features. The base layer may use a Scale-Invariant Feature Transform (SIFT) feature layer, a Histogram of Oriented Gradient (HOG) feature layer, a Visual Geometry Group (VGG) layer, or a googlenet layer, etc., for feature extraction. When feature extraction is performed via the VGG, first several layers in VGG 16 are used to extract image features. For example, the VGG 16 receives an input training image, which is, for example, 300*300*3. Firstly, the input training image may be pre-processed, then two convolution layers (convolution kernel is 3*3*3) are used for convolution processing, wherein summation is performed on 27 numbers in three-dimensional, a one-dimensional matrix of 298*298 is calculated by shifting a sliding window, and 300*300*1 is obtained by filling, 64 convolution kernels are configured in the first convolution layer, so 300*300*64 is obtained, and then 150*150*64 is obtained according to a step length of 2 and pooling of 2*2*64, further, as 128 convolution kernels are configured in the second convolution layer, 75*75*128 is obtained after processing, and so forth, convolution is performed layer by layer, and image features are obtained after pooling processing.

The background image of the training image is classified by the classification layer with the convolution layer, and then the classification layer is cascaded to the softmax layer to output the confidence levels of the image categories for the background image. The classification layer may be a Mobilenet layer, and the Mobilenet layer may be deep convolution and dot convolution (convolution kernel is 1*1). In deep convolution, each convolution kernel is applied to each channel, and the dot convolution is used to combine the outputs of channel convolution. The dot convolution may be followed by batchnorm and Rectified Linear Unit (ReLU), and then the training image is input to the softmax layer for classification, and a first loss function indicating a difference between a first predicted confidence level and a first true confidence level of an image category of the background image.

In an exemplary implementation, when the neural network is trained, the softmax layer may be configured with training sets of $\{(x^{(1)}, y^{(1)}), \ldots, (x^{(m)}, y^{(m)})\}$, and thus $y^{(1)} \in \{1, 2, 3, \ldots, k\}$, and there are k classifications in total. For each input x, there is a probability corresponding to each category, that is, $p(y=j|x)$. The cost function of softmax is as follows:

$$J(\theta) = -\frac{1}{m}\left[\sum_{i=1}^{m}\sum_{j=1}^{k} 1\{j = y^{(i)}\} \cdot \log(p(y^{(i)} = j|x^{(i)};\theta))\right],$$

in which the indicative function $1\{j=y^{(i)}\}$ is included, which means that if the category of the sample i is j, $y_{ij}=1$. The cost function can be regarded as a maximum likelihood function, that is, a minimum negative logarithmic likelihood function. Then the cost function is minimized by using the gradient descent algorithm.

The target detection layer is a convolution feature layer added at the end of the base layer. At the convolution feature layer, feature images of multiple scales may be detected by using a fixed prediction set generated by a set of convolution filters. A 3*3*p convolution kernel may be used for the convolution operation of a feature layer with p channels and a size of m*n, to obtain a second predicted confidence level corresponding to each object category. The target detection layer is cascaded to the softmax layer, and outputs the second predicted confidence level of an object category of the foreground target in the training image.

In the exemplary implementation, the background image of the training image is detected to obtain a first predicted confidence level, and the foreground target is detected to obtain a second predicted confidence level. The first predicted confidence level is a confidence level, which is predicted by the neural network, of an image category of the background image in the training image. The second predicted confidence level is a confidence level, which is predicted by the neural network, of the object category of the foreground target in the training image.

In an exemplary implementation, an image category and an object category may be pre-labeled in the training image so as to obtain a first true confidence level and a second true confidence level. The first true confidence level represents a confidence level of the image category of the background image pre-labeled in the training image. The second true confidence level represents a confidence level of the object category of the foreground target pre-labeled in the training image. For example, the first true confidence level may be represented by 1 (or a positive value) and 0 (or a negative value), which respectively indicates that the category of the background image belongs to the image category or does not belong to the image category. The second true confidence level may be represented by 1 (or a positive value) and 0 (or a negative value), which respectively indicates that the category of the foreground target belongs to the object category or does not belong to the object category.

In an exemplary implementation, the first loss function is obtained according to the difference between the first predicted confidence level and the first true confidence level, and the second loss function is obtained according to the difference between the second predicted confidence level and the second true confidence level. Both the first loss function and the second loss function may be a logarithmic function, a hyperbolic function, or an absolute value function, etc.

Figure 3:
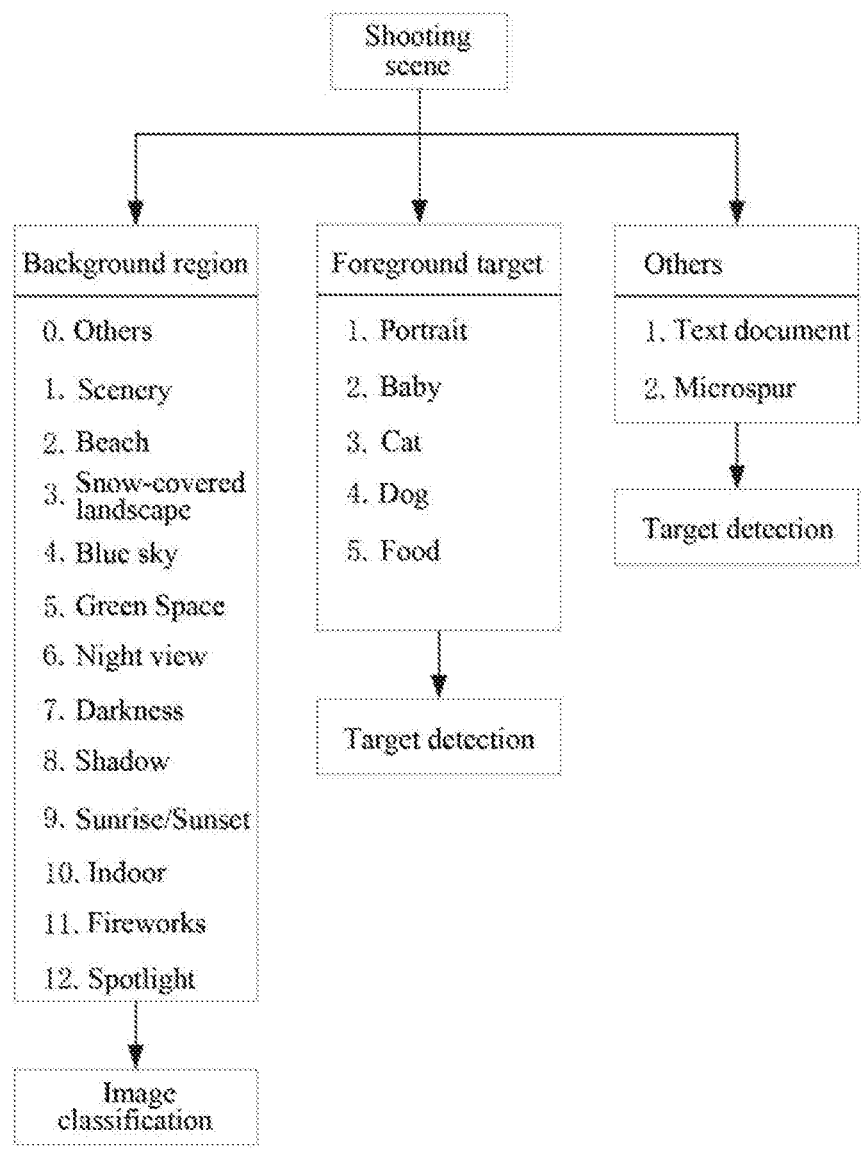
FIG. 3 is a schematic diagram of categories of shooting scenes according to an exemplary implementation.

FIG. 3 is a schematic diagram of categories of shooting scenes in an exemplary implementation. As shown in FIG. 3, shooting scenes of training images may include image categories, object categories, and others. The image categories may refer to categories of predefined image classifications. For example, the categories of image classifications may include scenery, beach, snow-covered landscape, blue sky, green space, night view, darkness, shadow, sunrise/sunset, indoor, fireworks, spotlight, etc. The object categories may be predefined categories of foreground targets in training images, for example, may include portrait, baby, cat, dog, food, etc. Others may be a text document, microspur, etc.

In action 202, weighted summation of the first loss function and the second loss function is calculated to obtain a target loss function.

In an exemplary implementation, the first loss function and the second loss function may be configured with corresponding weight values respectively, and the weight values may be adjusted according to the shooting scene. Then, the first loss function is multiplied by the corresponding first weight value a, the second loss function is multiplied by the corresponding second weight value b, and the two products are summed to obtain a target loss function.

In action 203, one or more parameters of the neural network are adjusted according to the target loss function to train the neural network.

The one or more parameters of neural network include the weight value of each layer. The target loss function is used to adjust one or more parameters of the neural network, so that both the first loss function and the second loss function are minimized, that is, the difference between the first predicted confidence level and the first true confidence level is minimized and the difference between the second predicted confidence level and the second true confidence level is minimized, thereby a trained neural network is obtained. In an exemplary implementation, adjusting one or more parameters of the neural network according to the target loss function may include adjusting a parameter of each layer, step by step, via a back propagation algorithm. The back propagation algorithm may be used to adjust one or more parameters of the neural network according to a chain rule in which the error between the output value and the true value of the target loss function are constantly iterated, until converged.

In the exemplary implementations, the target loss function is obtained by calculating a weighted summation of the first loss function corresponding to the image category of the background image and the second loss function corresponding to the object category of the foreground target in the training image, and one or more parameters of the neural network are adjusted according to the target loss function, so that the trained neural network can simultaneously recognize an image category (i.e., the image category of the background image) and a foreground target category (i.e., the object category of the foreground target), thereby obtaining more image information and improving the recognition efficiency.

In an exemplary implementation, the neural network may include at least one input layer, at least one base layer, at least one classification layer, at least one target detection layer, and two output layers. The two output layers may include a first output layer cascaded with the classification layer, and a second output layer cascaded with the target detection layer. In a training stage of the neural network, the input layer is used for receiving a training image, the first output layer is used for outputting a first predicted confidence level, which is detected via the classification layer, of the image category of the background image in the training image, and the second output layer is used for outputting a second predicted confidence level, which is detected by the target detection layer, of the object category of the foreground target in the training image.

In an exemplary implementation, in order to obtain a first predicted confidence level of the image category of the background image in the training image, and a second predicted confidence level of the object category of the foreground target in the training image, firstly, for each input training image, a first true confidence level and a second true confidence level related to the training image are input to the input layer of the neural network. Generally, if a category of the background image belongs to the image categories, the first true confidence level is 1, and if the category of the background image does not belong to the image categories, the first true confidence level is 0. If a category of the foreground target belongs to the object categories, the second true confidence level is 1, and if the category of the foreground target does not belong to the object categories, the second true confidence level is 0.

FIG. 4 is a schematic diagram of architecture of a neural network in an exemplary implementation. As shown in FIG. 4, a training image with image category labels (i.e., a training image pre-labeled with an image category and an object category) is received at an input layer of the neural network, one or more features of the training image are extracted via a base network (e.g., a VGG network), the one or more extracted image features are output to a classification layer and a feature layer of a target detection layer (i.e., a convolution feature layer as described before). A background image is detected via the classification layer to obtain a first loss function, and a foreground target is detected via the feature layer of the target detection layer to obtain a second loss function. Then a weighted summation of the first loss function and the second loss function is calculated to obtain a target loss function. When the weighted summation of the first loss function and the second loss function is calculated, a weight value of the first loss function is a first weight value a and a weight value of the second loss function is a second weight value b.

FIG. 5 is a flowchart of a method for training a neural network according to another exemplary implementation. As shown in FIG. 5, the method may include actions 501, 502, and 503.

In action 501: a training image with an image category, an object category and a true boundary box corresponding to the object category is input to a neural network, one or more features of the training image are extracted via a base layer of the neural network, the one or more extracted image features are input to a classification layer and a target detection layer, and a first loss function is obtained at the classification layer, the first loss function indicates a difference between a first predicted confidence level and a first true confidence level of the image category of the background image in the training image. A second loss function and a position loss function are obtained at the target detection layer, the second loss function indicates a difference between a second predicted confidence level and a second true confidence level of the object category of the foreground target in the training image, the position loss function is constructed according to offset parameters of each pre-selected default boundary box relative to the true boundary box corresponding to the object category.

In an exemplary implementation, the true boundary box corresponding to the object category may be a boundary box of a true position where the object category pre-labeled in the training image is located. For example, absolute coordinates of a point at the upper-left corner of the true boundary box and absolute coordinates of a point at the lower-right corner of the true boundary box may be recorded, or absolute coordinates of the point at the upper-left corner and relative coordinates of the point at the lower-right corner relative to the point at the upper-left corner may be recorded, or absolute coordinates of the point at the lower-right corner and relative coordinates of the point at the upper-left corner relative to the point at the lower-right corner may be recorded, or coordinates of a center point, a length and width of the true boundary box may be recorded. For each true boundary box, a default boundary box corresponding to the true boundary box may be selected from a default boundary box set, to obtain a pre-selected default boundary box. The pre-selected default boundary box may vary with a location, an aspect ratio, and a size. The default boundary box is matched with any true boundary box with jaccard overlapping greater than a threshold (e.g., 0.5) to establish a correspondence between the default boundary box and the true boundary box. The offset parameters of each pre-selected default boundary box relative to the true boundary box corresponding to the object category may include coordinates (cx, cy) of the center point, a width offset (w) and a height offset (h) of the default boundary box. A position loss function can be constructed according to the offset parameters.

Figure 6:
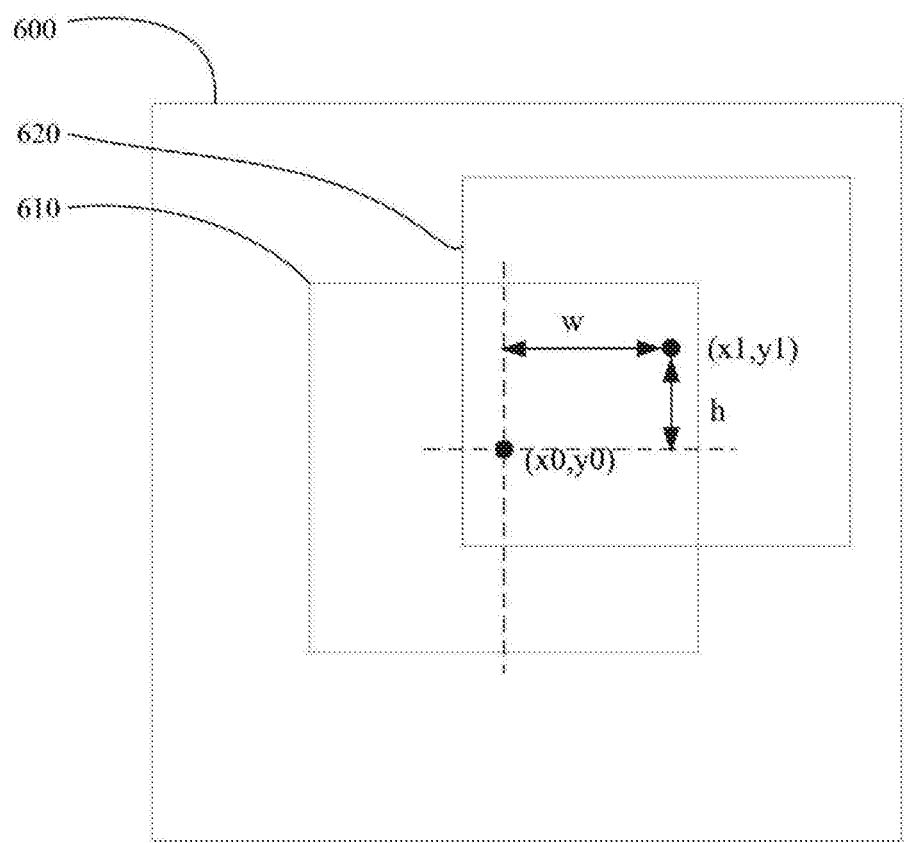
FIG. 6 is a schematic diagram of position determination of foreground targets in a training image according to an exemplary implementation.

As shown in FIG. 6, coordinates of a center pixel point of the true boundary box 610 corresponding to the object category of the training image 600 are (x0, y0), coordinates of the center pixel point of the pre-selected default boundary box 620 are (x1, y1), and the width offset and the height offset of the default boundary box 620 relative to the true boundary box 610 are w and h respectively, where w is x1−x0 and h is y1−y0. The position loss function is constructed according to the four offset parameters (x1, y1, w, h).

In action 502, a weighted summation of the first loss function, the second loss function and the position loss function is calculated to obtain the target loss function.

In an exemplary implementation, the first loss function, the second loss function and the position loss function are respectively configured with corresponding weight values, which may be adjusted according to the shooting scene. Then, the first loss function is multiplied by the corresponding first weight value a, the second loss function is multiplied by the corresponding second weight value b, the position loss function is multiplied by the corresponding third weight value c, and the three products are summed to obtain the target loss function.

In action 503, one or more parameters of the neural network are adjusted according to the target loss function to minimize the first loss function, the second loss function and the position loss function.

For example, the position loss function may indicate smoothing loss of the offset parameters of the pre-selected default boundary box and the true boundary box.

In the exemplary implementations, the target loss function is obtained by calculating a weighted summation of the first loss function corresponding to the image category and the second loss function corresponding to the object category, and one or more are parameters of the neural network are adjusted according to the target loss function, so that the trained neural network can simultaneously recognize the image category (i.e., the image category of the background image) and the foreground target category (i.e., the object category of the foreground target), thereby obtaining more information and improving the recognition efficiency.

In an exemplary implementation, the neural network may include at least one input layer, at least one base layer, at least one classification layer, at least one target detection layer, and two output layers. The two output layers may include a first output layer cascaded with the classification layer and a second output layer cascaded with the target detection layer. In a training stage of the neural network, the input layer is used for receiving a train image, the first output layer is used for outputting a first predicted confidence level, which is detected via the classification layer, of an image category of the background image in the train image; and the second output layer is used for outputting offset parameters, which is detected via the target detection layer, of each pre-selected default boundary box relative to the true boundary box corresponding to the object category, and a second predicted confidence level, which is detected via the target detection layer, of the object category of the foreground target in the training image.

Figure 7:
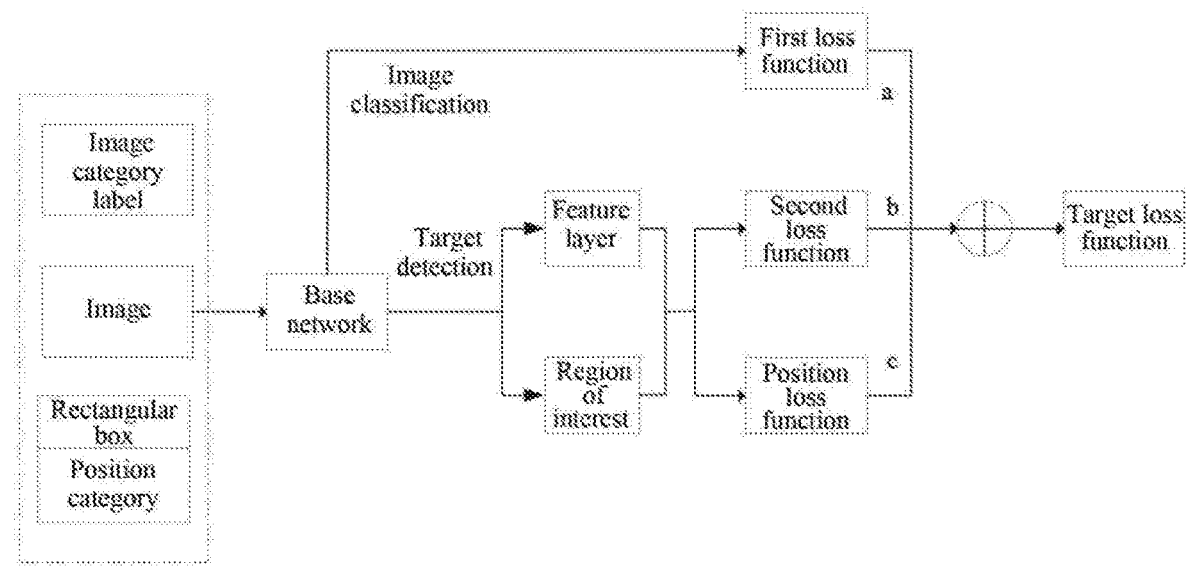
FIG. 7 is a schematic diagram of architecture of a neural network according to another exemplary implementation.

FIG. 7 is a schematic diagram of architecture of a neural network according to another exemplary implementation. As shown in FIG. 7, a training image with labels (i.e., pre-labeled with an image category, an object category, and a true boundary box corresponding to the object category) is received at an input layer of the neural network, one or more features of the training image are extracted via a base network (e.g., a VGG network), the one or more extracted image features are output to a classification layer and a target detection layer, then category detection for a background image of the training image is performed at the classification layer to obtain a first loss function, target detection for a foreground target is performed at the target detection layer to obtain a second loss function, and position detection for the foreground target is performed at the target detection layer to obtain a position loss function. Then a weighted summation of the first loss function, second function and position loss function is calculated to obtain a target loss function. When the weighted summation is calculated, the weight value of the first loss function is a first weight value a, the weight value of the second loss function is a second weight value b, and the weight value of the position loss function is a third weight value c.

In an exemplary implementation, the neural network may include an input layer, a base layer, a classification layer, a target detection layer, and two output layers (i.e., a first output layer and a second output layer). The input layer is used for receiving input images (e.g., training images, or images to be detected). The base layer is used to perform pre-processing and feature extraction on the image input by the base layer. The pre-processing may include de-averaging, normalization, dimensionality reduction, and whitening. The de-averaging is to centralize each dimension of the data of an input image to 0, to make the center of the sample be the origin point of the coordinate system. The normalization is to normalize the amplitudes to the same range. The whitening is to normalize the amplitude on each feature axis of the data. Feature extraction may include, for example, using the first five convolution layers of VGG 16 to perform feature extraction on the input image. The extracted one or more features are then input to the classification layer and the target detection layer. In the training stage of the neural network, deep convolution and dot convolution of the Mobilenet network may be used to detect one or more features of the image at the classification layer, and then the image is input to the output layer (i.e. the first output layer) to obtain the first predicted confidence level of the image category of the background image in the input image, and then the first loss function is obtained based on the difference between the first predicted confidence level and the first true confidence level. A Single Shot Multibox Detector (SSD) network may be used at the target detection layer, and a convolution feature layer is cascaded after the first five convolution layers of VGG 16, and a set of convolution filters are used at the convolution feature layer to predict the offset parameters of the pre-selected default boundary box relative to the true boundary box corresponding to the object category and the second predicted confidence level of the object category of the foreground target in the input image. A region of interest is the region of the pre-selected default boundary box. In the exemplary implementation, the position loss function may be constructed according to the offset parameters, and the second loss function may be obtained according to the difference between the second predicted confidence level and the second true confidence. Then, a weighted summation of the first loss function, the second loss function and the position loss function is calculated to obtain the target loss function. According to the target loss function, a back propagation algorithm is used to adjust one or more parameters of the neural network to train the neural network.

In the exemplary implementation, when the trained neural network is used to recognize an image to be detected, the input image to be detected is received at the input layer of the neural network, one or more features of the image to be detected are extracted, and the one or more extracted image features of the image to be detected are input to the classification layer for image classification and recognition, the confidence level of each image category for the background image of the image is output via the softmax classifier at the first output layer, and an image category of which the confidence level is highest and greater than the confidence level threshold is selected as an image category of the background image. The extracted one or more features of the image to be detected are input to the target detection layer for foreground target detection. The confidence levels of object categories for the foreground target in the image and corresponding positions of the object categories are output via the softmax classifier at the second output layer, and an object category of which the confidence level is highest and greater than the confidence level threshold is selected as an object category of the foreground target in the image, and the position corresponding to the object category is output.

Figure 8:
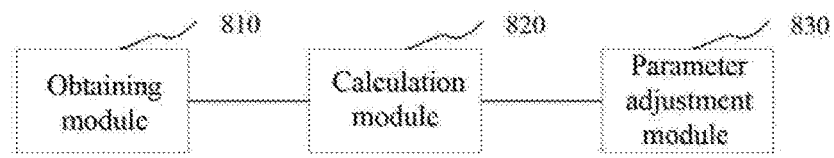
FIG. 8 is a block diagram of structure of a training device in a neural network according to an exemplary implementation.

FIG. 8 is a block diagram of structure of a training device of a neural network according to an exemplary implementation. As shown in FIG. 8, the training device may include an obtaining module 810, a calculation module 820, and a parameter adjustment module 830.

The obtaining module 810 is configured to input a training image with an image category and an object category, extract one or more features of the training image via a base layer of the neural network, respectively input the one or more extracted image features to a classification layer and a target detection layer to obtain a first loss function at the classification layer and a second loss function at the target detection layer. The first loss function indicates a difference between a first predicted confidence level and a first true confidence level of the image category of the background image in the training image; the second loss function indicates a difference between a second predicted confidence level and a second true confidence level of the object category of the foreground target in the training image.

The calculation module 820 is configured to calculate a weighted summation of the first loss function and the second loss function to obtain a target loss function.

The parameter adjustment module 830 is configured to adjust one or more parameters of the neural network according to the target loss function to train the neural network.

In an exemplary implementation, the neural network may include at least one input layer, at least one base layer, at least one classification layer, at least one target detection layer, and two output layers. The two output layers may include a first output layer cascaded with the classification layer, and a second output layer cascaded with the target detection layer. In a training stage of the neural network, the input layer is used for receiving a training image, the first output layer is used for outputting a first predicted confidence level, which is detected via the classification layer, of the image category of the background image; and the second output layer is used for outputting a second predicted confidence level, which is detected via the target detection, of the object category of the foreground target.

In an exemplary implementation, the base layer may be a VGG layer, the classification layer may be a Mobilenet layer, the target detection layer may be an SSD layer, and the output layer may be a softmax classifier.

In an exemplary implementation, the calculation module 820 may be further configured to input the one or more extracted image features to the target detection layer for position training to obtain offset parameters of each preselected default boundary box relative to the true boundary box corresponding to the object category, construct a position loss function according to the offset parameters, then calculate a weighted summation of the first loss function, the second loss function, and the position loss function to obtain a target loss function.

The parameter adjustment module 830 may be further configured to adjust one or more parameters of the neural network according to the target loss function to minimize the first loss function, the second loss function, and the position loss function.

In an exemplary implementation, the neural network may include at least one input layer, at least one base layer, at least one classification layer, at least one target detection layer, and two output layers. The two output layers may include a first output layer cascaded with the classification layer, and a second output layer cascaded with the target detection layer. In a training stage of the neural network, the input layer is used for receiving a training image, the first output layer is used for outputting a first predicted confidence level, which is detected via the classification layer, of the image category of the background image; and the second output layer is used for outputting offset parameters which is detected via the target detection layer, of each pre-selected default boundary box relative to a true boundary box corresponding to the object category and a second predicted confidence level, which is detected via the target detection layer, of the object category of the foreground target.

The construction process of the neural network described above will be illustrated with reference to FIG. 9. In the exemplary implementation, after the neural network is constructed, the neural network may be trained by a training process as described with reference to FIG. 2 or FIG. 5. After the training of the neural network is completed, the trained neural network may be used in an image processing method as described with reference to FIG. 1

Figure 9:
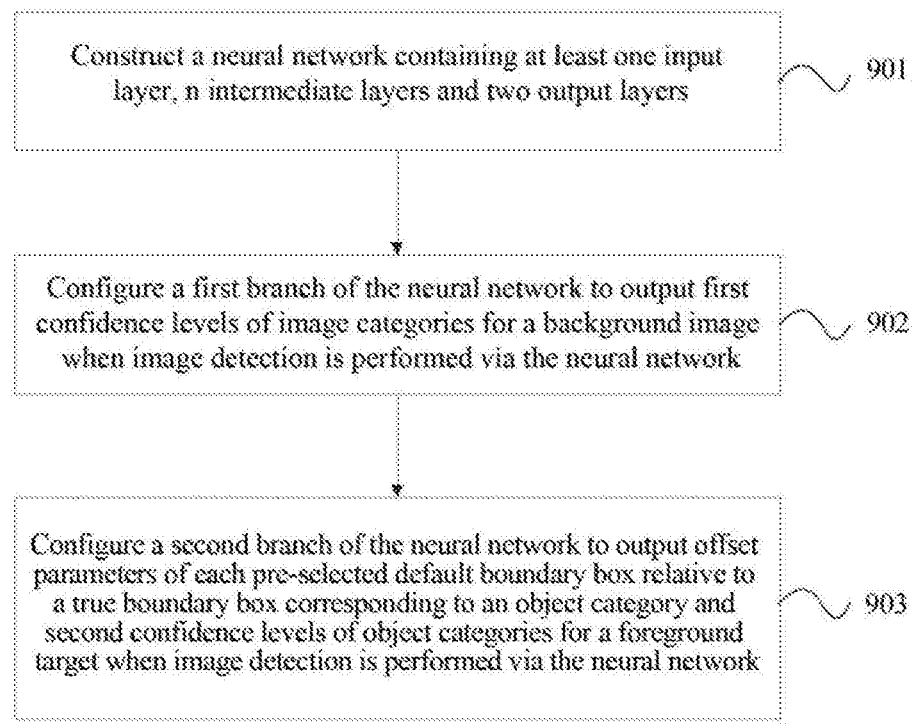
FIG. 9 is a flowchart of a method for constructing a neural network according to an exemplary implementation.

FIG. 9 is a flowchart of a method for constructing a neural network according to an exemplary implementation. As shown in FIG. 9, the method may include actions 802, 804, and 806.

In action 802, a neural network containing at least one input layer, n intermediate layers and two output layers is constructed, wherein the ith intermediate layer is configured as an image feature extraction layer (corresponding to the base layer in the implementations described before), the jth intermediate layer (corresponding to the classification layer in the implementations described before) is cascaded to the first branch of the neural network, and the kth intermediate layer (corresponding to the target detection layer in the implementations described before) is cascaded to the second branch of the neural network, where i is less than j, j is less than k; i, j, k and n are positive integers, and i, j and k are all less than n. One output layer (corresponding to the first output layer in the implementations described before) is located in the first branch and the other output layer (corresponding to the second output layer in the implementations described before) is located in the second branch.

In action 804, when the neural network is used for image detection, the first branch of the neural network is configured to output first confidence levels. The first confidence levels are confidence levels, which are detected by the neural network, of the image categories for a background image.

In action 806, when the neural network is used for image detection, the second branch of the neural network is configured to output offset parameters of each pre-selected default boundary box relative to the true boundary box corresponding to the object category of a foreground target and second confidence levels of the object categories for the foreground target. The second confidence levels are confidence levels, which are detected by the neural network, of the object categories for the foreground target.

In an exemplary implementation, the neural network for detecting the background image category (i.e., the image category of the background image), the foreground target category (i.e., the object category of the foreground target) and the foreground target position is constructed, and a target loss function is obtained by calculating a weighted summation of the corresponding detection results, and the neural network is adjusted according to the target loss function, then a background image category, a foreground target category and a position of the foreground target of an image can be simultaneously detected by the neural network, thereby obtaining more image information and improving the detection efficiency.

Figure 10:
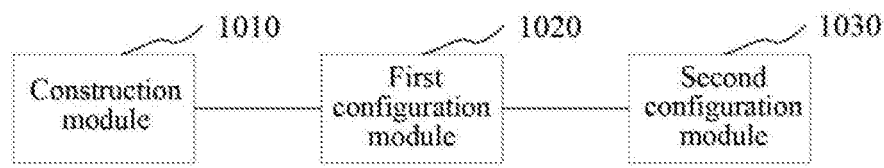
FIG. 10 is block diagram of structure of a device for constructing a neural network according to an exemplary implementation.

FIG. 10 is block diagram of structure of a device for constructing a neural network according to an exemplary implementation. As shown in FIG. 10, the device may include a construction module 1010, a first configuration module 1020 and a second configuration module 1030.

The construction module 1010 is configured to construct a neural network containing at least one input layer, n intermediate layers and two output layers, wherein the i th intermediate layer is configured as an image feature extraction layer (corresponding to the base layer in the implementations described before), the j th intermediate layer (corresponding to the classification layer in the implementations described before) is cascaded to the first branch of the neural network, and the k th intermediate layer (corresponding to the target detection layer in the implementations described before) is cascaded to the second branch of the neural network, where i is less than j, j is less than k; i, j, k and n are positive integers, and i, j and k are all less than n; one output layer (corresponding to the first output layer in the implementations described before) is located in the first branch and the other output layer (corresponding to the second output layer in the implementations described before) is located in the second branch.

The first configuration module 1020 is configured to, when the neural network is used for image detection, output first confidence levels. The first confidence levels are confidence levels, which are detected by the neural network, of image categories for the background image.

The second configuration module 1030 is configured to, when the neural network is used for image detection, output offset parameters of each pre-selected default boundary box relative to a true boundary box corresponding to the object category of the foreground target and second confidence levels of the object categories for the foreground target. The second confidence levels are confidence levels, which are detected by the neural network, of the object categories for the foreground target.

The neural network construction device obtains the target loss function by constructing the neural network for detecting the background category, the foreground target category and the position of the foreground target, and calculating a weighted summation of the corresponding detection results, adjusting the neural network according to the target loss function. Then the neural network can be used for detecting a background image category, a foreground target category and a foreground target position of an image, thereby obtaining more image information and improving the detection efficiency.

Figure 11:
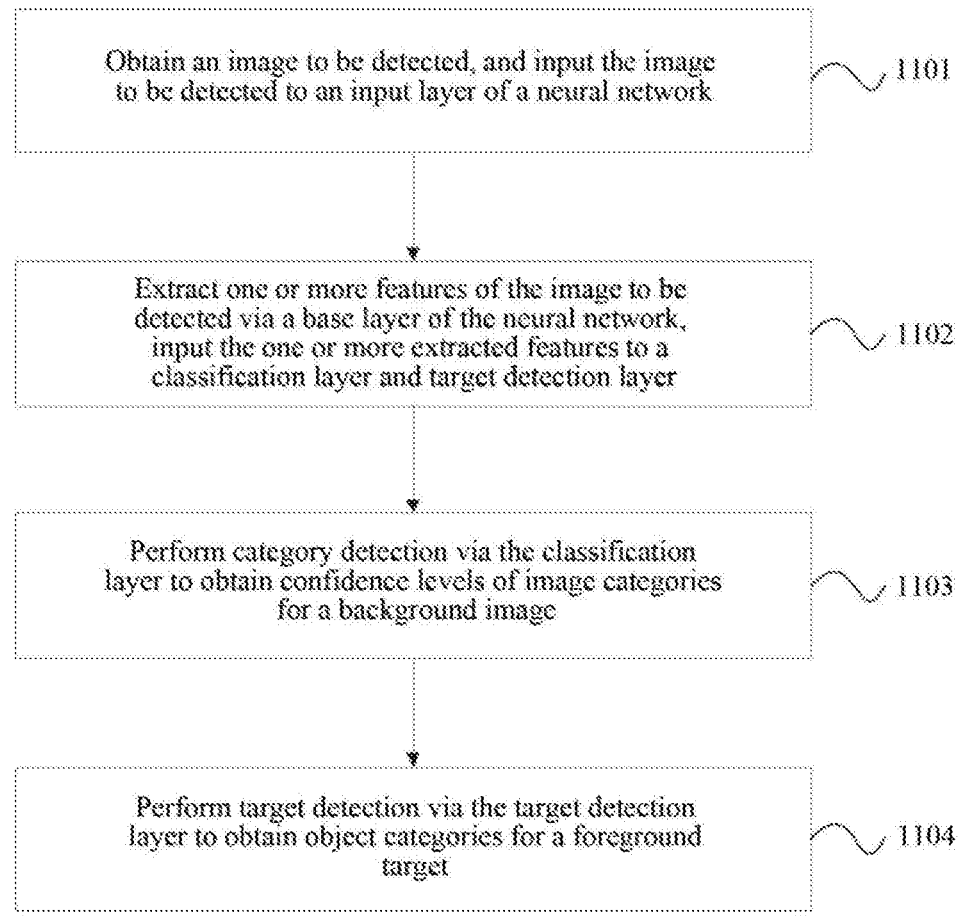
FIG. 11 is a flowchart of an image processing method according to another exemplary implementation.

FIG. 11 is a flowchart of an image processing method according to an exemplary implementation. As shown in FIG. 11, the method may include actions 1101, 1102, 1103, and 1104.

In action 1101, an image to be detected is obtained and input to an input layer of a neural network.

The image to be detected may be any image, such as an image downloaded from a network, or an image in local album of a mobile terminal or a shooting image.

In action 1102: one or more features of the image to be detected are extracted via a base layer of the neural network, and the one or more extracted image features are input to a classification layer and a target detection layer.

In action 1103, category detection is performed via the classification layer to obtain confidence levels of image categories for the background image.

In action 1104, target detection is performed via the target detection layer to obtain confidence levels of the object categories for the foreground target.

According to the image processing method, the image to be detected is detected via the neural network, and the background image and the foreground target of the image are simultaneously detected, so that an image category of the background image and an object category of the foreground target can be simultaneously recognized, thereby obtaining more image information.

In an exemplary implementation, the neural network may include at least one input layer, at least one base layer, at least one classification layer, at least one target detection layer, and two output layers. The two output layers may include a first output layer cascaded with the classification layer, and a second output layer cascaded with the target detection layer. In a training stage of the neural network, the input layer is used for receiving a training image, the first output layer is used for outputting a first predicted confidence level, which is detected via the classification layer, of the image category of the background image; and the second output layer is used for outputting a second predicted confidence level, which is detected via the target detection layer, of the object category of the foreground target.

In an exemplary implementation, the neural network may be trained by using a target loss function which is obtained by calculating a weighted summation of a first loss function and a second loss function; the first loss function indicates a difference between a first predicted confidence level and a first true confidence level of the image category of a background image in the training image; the second loss function indicates a difference between a second predicted confidence level and a second true confidence level of the object category a the foreground target in the training image; the first predicted confidence level is a confidence level, which is predicted by the neural network, of the image category pre-labeled in the training image and the first true confidence level is a true confidence level of the image category pre-labeled in the training image; the second predicted confidence level is a confidence level, predicted by the neural network, of the object category pre-labeled in the training image, and the second true confidence level is a true confidence level of the object category pre-labeled in the training image.

In an exemplary implementation, the image processing method may further include performing target detection via the target detection layer to obtain a position of the foreground target and the confidence levels of the object categories for the foreground target.

In an exemplary implementation, the neural network may include at least one input layer, at least one base layer, at least one classification layer, at least one target detection layer, and two output layers. The two output layers includes a first output layer cascaded with the classification layer and a second output layer cascaded with the target detection layer. In the training stage of the neural network, the input layer is used for receiving a training image, and the first output layer is used for outputting a first predicted confidence level, which is detected via the classification layer, of the image category of the background image; the second output layer is used for outputting offset parameters, which are detected via the target detection layer, of each pre-selected default boundary box relative to a true boundary box corresponding to the object category of the foreground target and a second predicted confidence level, which is detected via the target detection layer, of the object category of the foreground target.

In an exemplary implementation, the neural network may be trained by using a target loss function which is obtained by calculating a weighted summation of a first loss function, a second loss function, and a position loss function. The first loss function indicates a difference between a first predicted confidence level and a first true confidence level of the image category of the background image in a training image; the second loss function indicates a difference between a second predicted confidence level and a second true confidence level of the object category of a foreground target in the training image; and the position loss function is constructed according to offset parameters of each pre-selected default boundary box relative to a true boundary box corresponding to the object category. The first predicted confidence level is a confidence level, which is predicted by the neural network, of the image category pre-labeled in the training image, and the first true confidence level is a true confidence level of the image category pre-labeled in the training image. The second predicted confidence level is a confidence level, which is predicted by the neural network, of the object category pre-labeled in the training image, and the second true confidence level is a true confidence level of the object category pre-labeled in the training image.

Figure 12:
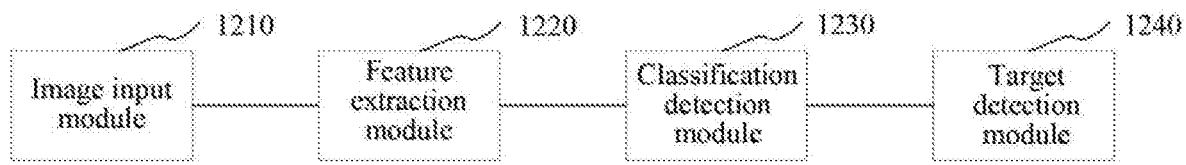
FIG. 12 is a block diagram of structure of an image processing apparatus according to an exemplary implementation.

FIG. 12 is a block diagram of structure of an image processing device according to an exemplary implementation. As shown in FIG. 12, the image processing device may include an image input module 1210, a feature extraction module 1220, a classification detection module 1230, and a target detection module 1240.

The image input module 1210 is configured to obtain an image to be detected and input the image to be detected to an input layer of a neural network.

The feature extraction module 1220 is configured to extract one or more features of the image to be detected via a base layer of the neural network and input the one or more extracted image features to a classification layer and a target detection layer.

The classification detection module 1230 is configured to perform category detection via the classification layer to obtain confidence levels of image categories for the background image.

The target detection module 1240 is configured to perform target detection via the target detection layer to obtain confidence levels of object categories for the foreground target.

In an exemplary implementation, the neural network may include at least one input layer, at least one base layer, at least one classification layer, at least one target detection layer, and two output layers. The two output layers may include a first output layer cascaded with the classification layer, and a second output layer cascaded with the target detection layer. In a training stage of the neural network, the input layer is used for receiving a training image, the first output layer is used for outputting a first predicted confidence level, which is detected via the classification layer, of the image category of the background image; and the second output layer is used for outputting a second predicted confidence level, which is detected via the target detection, of the object category of the foreground target. The neural network may be trained by using a target loss function which obtained by calculating a weighted summation of a first loss function, a second loss function, and a position loss function. The first loss function indicates a difference between a first predicted confidence level and a first true confidence level of the image category of the background image in a training image; the second loss function indicates a difference between a second predicted confidence level and a second true confidence level of the object category of a foreground target in the training image; and the position loss function is constructed according to offset parameters of each pre-selected default boundary box relative to a true boundary box corresponding to the object category. The first predicted confidence level is a confidence level, which is predicted by the neural network, of the image category pre-labeled in the training image, and the first true confidence level is a true confidence level of the image category pre-labeled in the training image. The second predicted confidence level is a confidence level, which is predicted by the neural network, of the object category pre-labeled in the training image, and the second true confidence level is a true confidence level of the object category pre-labeled in the training image.

In an exemplary implementation, the target detection module 1240 may be further configured to perform target detection via the target detection layer to obtain a position of the foreground target and the confidence levels of the object categories for the foreground target.

In an exemplary implementation, the neural network may include at least one input layer, at least one base layer, at least one classification layer, at least one target detection layer, and two output layers. The two output layers may include a first output layer cascaded with the classification layer, and a second output layer cascaded with the target detection layer. In a training stage of the neural network, the input layer is used for receiving a training image, the first output layer is used for outputting a first predicted confidence level, which is detected via the classification layer, of the image category of the background image; and the second output layer is used for outputting offset parameters, which is detected via the target detection, of each pre-selected default boundary box relative to a true boundary box corresponding to the object category and a second predicted confidence level, which is detected via the target detection, of the object category of the foreground target. The neural network may be trained by using a target loss function which is obtained by calculating a weighted summation of a first loss function, a second loss function, and a position loss function. The first loss function indicates a difference between a first predicted confidence level and a first true confidence level of the image category of the background image in a training image; the second loss function indicates a difference between a second predicted confidence level and a second true confidence level of the object category of a foreground target in the training image; and the position loss function is constructed according to offset parameters of each pre-selected default boundary box relative to a true boundary box corresponding to the object category. The first predicted confidence level is a confidence level, which is predicted by the neural network, of the image category pre-labeled in the training image, and the first true confidence level is a true confidence level of the image category pre-labeled in the training image. The second predicted confidence level is a confidence level, which is predicted by the neural network, of the object category pre-labeled in the training image, and the second true confidence level is a true confidence level of the object category pre-labeled in the training image.

Although the actions in the flowcharts of FIG. 2, FIG. 5, FIG. 9, and FIG. 11 are shown in sequence as indicated by the arrows, these actions are not necessarily performed in sequence as indicated by the arrows. Unless explicitly stated herein, the execution of these actions is not strictly limited in sequence, and these actions may be executed in other sequence. Moreover, at least part of the actions in FIG. 1, FIG. 2, FIG. 5, FIG. 9, and FIG. 11 may include multiple sub-actions or stages, which may not necessarily be completed at the same time, but may be performed at different times, and the sequence of execution of these sub-actions or stages may not necessarily be performed sequentially, but may be performed alternately with at least part of the sub-actions or stages of other actions or other actions.

The division of each module in the training device of the neural network, the construction device of the neural network or the image processing device is only for illustration. In other implementations, the training device, the construction device or the image processing device of the neural network may be divided into different modules as needed to complete all or part of the functions of the neural network training device, the construction device or the image processing device of the of the neural network.

An implementation of the present disclosure also provides a mobile terminal. The mobile terminal may include a processor and a memory storing a computer program, and when the computer program is executed by the processor to perform the actions of: obtaining an image to be detected; inputting the image to be detected to a neural network; detecting the image to be detected via the neural network to obtain confidence levels of image categories for a background image in the image and confidence levels of image categories for a foreground target in the image; determining an image category of the background image according to the confidence levels of the image categories for the background image and a confidence level threshold; and determining an object category of the foreground target according to the confidence levels of the object categories for the foreground target and the confidence level threshold.

In an exemplary implementation, the neural network may include at least one input layer, at least one base layer, at least one classification layer, and at least one target detection layer. The input level is cascaded to the base layer, and the base layer is cascaded to the classification layer and the target detection layer. When the computer program is executed by the processor, the processor will perform action of: inputting an image to be detected to an input layer of a neural network; extracting one or more features of the image to be detected via a base layer of the neural network, and inputting the one or more extracted image features to the classification layer and the target detection layer; obtaining confidence levels of the image categories for the background image via category detection at the classification layer; obtaining confidence levels of the object category for the foreground target via the target detection at the target detection layer.

In an exemplary implementation, the neural network may include a first output layer and a second output layer, the first output layer is cascaded to the classification layer, and the second output layer is cascaded to the target detection layer. The first output layer may be configured to output confidence levels of the image categories for the background image, and the second output layer may be configured to output the confidence levels of the object categories for the foreground target.

In an exemplary implementation, when the computer program is executed by the processor, the processor will perform actions of: inputting a training image pre-labeled with an image category and an object category to the neural network to train the neural network.

In an exemplary implementation, when the computer program is executed by the processor, the processor will further perform actions of: performing target detection at the target detection layer to obtain a position of the foreground target in the image.

In an exemplary implementation, when the computer program is executed by the processor, the processor will further perform actions of: inputting a training image pre-labeled with an image category, an object category, and a true boundary box corresponding to the object category to the neural network to train the neural network.

An implementation of the present disclosure also provides a computer readable storage medium storing a program that is executed by a processor to perform the processing method provided in the above implementations, such as performing actions of: obtaining an image to be detected; inputting the image to be detected to a neural network; detecting the image to be detected via the neural network to obtain confidence levels of image categories for a background image in the image and confidence levels of image categories for a foreground target in the image.

Figure 13A:
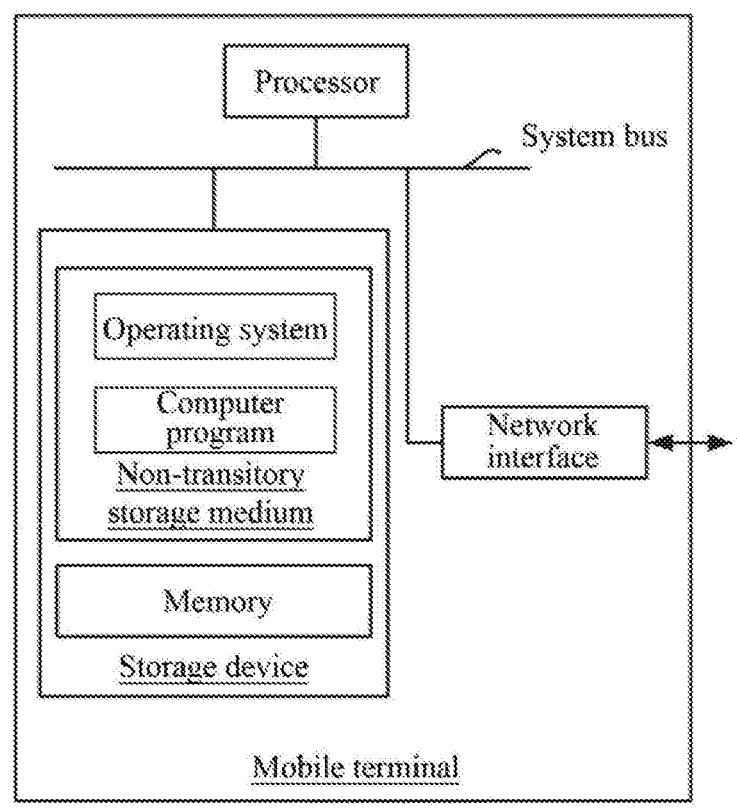
FIG. 13A is a schematic diagram of internal structure of a mobile terminal according to an exemplary implementation.

FIG. 13A is a schematic diagram of internal structure of a mobile terminal according to an exemplary implementation. As shown in FIG. 13A, the mobile terminal may include a processor, a memory and a network interface, which are connected via a system bus. The processor is used to provide computing and control capabilities to support the running of the entire mobile terminal. The memory is used to store data, programs and the like. The memory stores at least one computer program that is executed by the processor to implement the image processing method applicable to the mobile terminal provided in the implementations of the present disclosure. The memory may include a non-transitory storage medium and a memory. The non-transitory storage medium stores one or more operating system and computer program. The computer program may be executed by the processor for implementing the training method, construction method or image processing method of the neural network provided in the above implementations. The memory provides a high-speed cached operating environment for one or more operating system and computer program in the non-transitory storage medium. The network interface may be an Ethernet card or a wireless card, etc., for communicating with an external mobile terminal. The mobile terminal may be a mobile phone, a tablet computer, a personal digital assistant, a wearable device, etc.

Figure 13B:
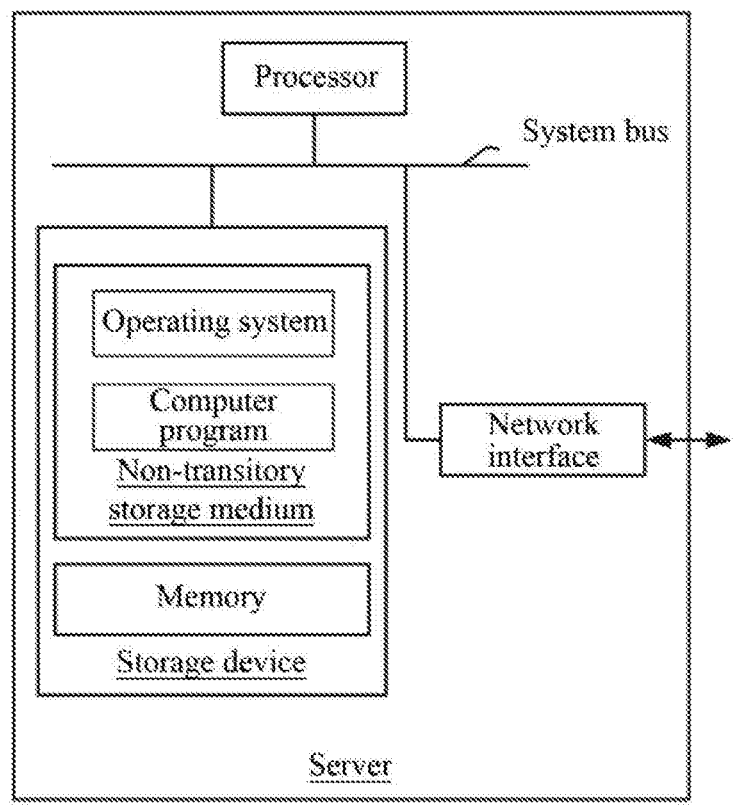
FIG. 13B is a schematic diagram of internal structure of a server according to an exemplary implementation.

FIG. 13B is a schematic diagram of internal structure of a server (or cloud, etc.) according to an exemplary implementation. As shown in FIG. 13B, the server may include a processor, a memory and a network interface, which are connected via a system bus. The processor is used to provide computing and control capabilities to support the running of the entire mobile terminal. The memory is used to store data, programs and the like. The memory stores at least one computer program that is executed by the processor to implement the image processing method applicable to the mobile terminal provided in the implementations of the present disclosure. The memory may include a non-transitory storage medium and a memory. The non-transitory storage medium stores one or more operating system and computer program. The computer program may be executed by the processor for implementing the training method, construction method or image processing method of the neural network provided in the above implementations. The memory provides a high-speed cached operating environment for one or more operating system and computer in the non-transitory storage medium. The network interface may be an Ethernet card or a wireless card, etc., for communicating with an external mobile terminal. The server may be implemented as a stand-alone server or a server cluster composed of multiple servers. Those skilled in the art will understand that the structure shown in FIG. 13B is only a block diagram of a part of the structure related to the solution of the present disclosure, but does not constitute restriction of the server to which the solution of the disclosure is applied. The server can include more or fewer components than shown in the figure, or combine some components, or have different component arrangements.

Any module in the training device, the building device or the image processing device of the neural network provided in the implementations of the present disclosure may be implemented in the form of a computer program. The computer program may run on a mobile terminal or server. The program modules constituted by the computer program may be stored in the memory of the mobile terminal or the server. The computer program, when executed by the processor, implements the actions of the method described in the implementations of the present disclosure.

A computer program containing instructions is provided, when the computer program is run by a computer to perform the training method or the image processing method of a neural network.

Figure 14:
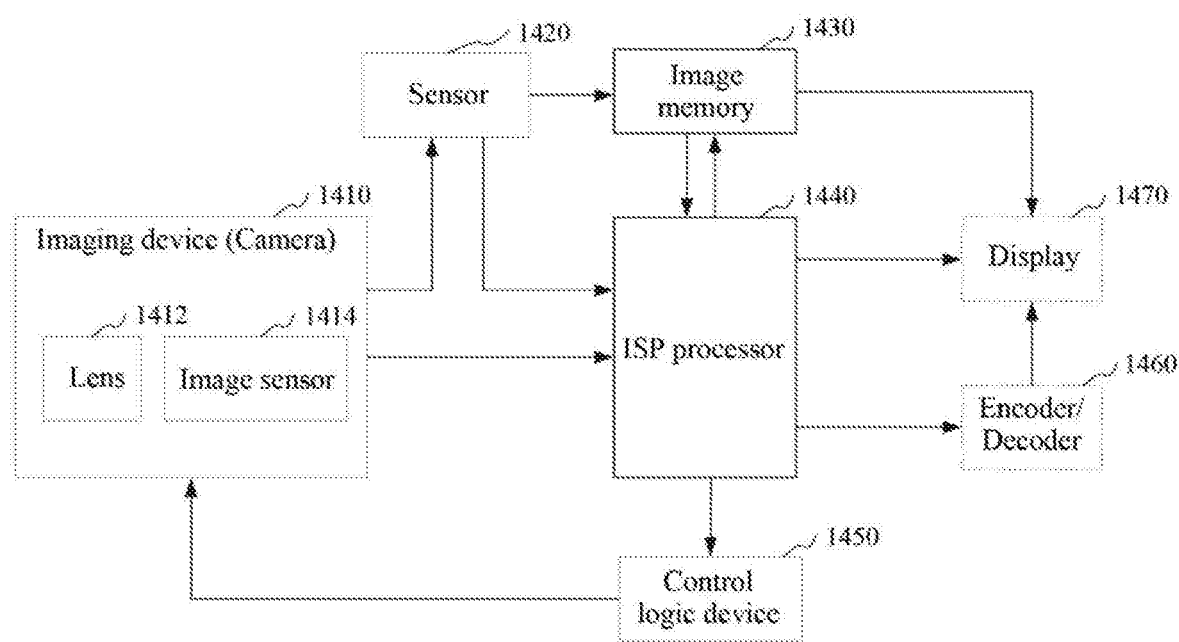
FIG. 14 is a schematic diagram of an image processing circuit according to an exemplary implementation.

An implementation of the present disclosure also provides a mobile terminal. The above mobile terminal includes an image processing circuit. The image processing circuit may be implemented by hardware and/or software components, and may include various processing units defining Image Signal Processing (ISP) pipelines. FIG. 14 is a schematic diagram of an image processing circuit according to an exemplary implementation. In FIG. 14, only the image processing technology aspect related to the implementation of the present disclosure is shown for ease of illustration.

As shown in FIG. 14, the image processing circuit includes ISP processor 1440 and control logic 1450. Image data captured by an imaging device 1410 is first processed by the ISP processor 1440, which analyzes the image data to capture image statistics that can be used to determine one or more control parameters of the imaging device 1410. The imaging device 1410 may include a camera having one or more lenses 1412 and an image sensor 1414. The image sensor 1414 may include an array of color filters (e.g., Bayer filters), and the image sensor 1414 may acquire light intensity and wavelength information captured with each imaging pixel of the image sensor 1414 and provide a set of original image data that may be processed by the ISP processor 1440. The sensor 1420 (e.g., gyroscope) may provide obtained image processing parameters (e.g., anti-shake parameters) to the ISP processor 1440 based on the interface type of the sensor 1420. The interface of the sensor 1420 may utilize a Standard Mobile Imaging Architecture (SMIA) interface, other serial or parallel camera interfaces, or a combination of the above interfaces.

In addition, the image sensor 1414 may also send the original image data to the sensor 1420, and the sensor 1420 may provide the original image data to the ISP processor 1440 based on the interface type of the sensor 1420, or the sensor 1420 may store the original image data in the image memory 1430.

The ISP processor 1440 processes the original image data pixel by pixel in various formats. For example, each image pixel may have a bit depth of 8, 10, 12, or 14 bits, and the ISP processor 1440 may perform one or more image processing operations on the original image data and collect statistical information related to the image data. The image processing operation can be performed with the same or different bit depth accuracy.

The ISP processor 1440 may also receive image data from the image memory 1430. For example, the interface of the sensor 1420 sends the original image data to the image memory 1430, and the original image data in the image memory 1430 is provided to the ISP processor 1440 for processing. The image memory 1430 may be a part of a memory device, or a separate dedicated memory within a memory equipment or a mobile terminal, and may include Direct Memory Access (DMA) feature.

Upon receiving the original image data from the interface of the image sensor 1414 or from the interface of the sensor 1420 or from the image memory 1430, the ISP processor 1440 may perform one or more image processing operations, such as time domain filtering. The processed image data may be sent to the image memory 1430 for further processing before being displayed. The ISP processor 1440 may receive processing data from image memory 1430 and process the processing data in original domain and in RGB and YCbCr color spaces. The image data processed by the ISP processor 1440 may be output to the display 1470 for viewing by a user and/or further processed by a graphics engine or Graphics Processing Unit (GPU). In addition, the output of the ISP processor 1440 may also be sent to the image memory 1430, and the display 1470 can read the image data from the image memory 1430. In an exemplary implementation, the image memory 1430 may be configured to implement one or more frame buffers. In addition, the output of the ISP processor 1440 may be sent to encoder/decoder 1460 to encode/decode the image data. The encoded image data may be saved and decompressed before being displayed on the display 1470. The encoder/decoder 1460 may be implemented by a Central Processing Unit (CPU) or GPU or co-processor.

The statistic data determined by the ISP processor 1440 may be sent to the control logic 1450. For example, the statistical data may include statistical information of the image sensor 1414, such as auto exposure, auto white balance, auto focus, flicker detection, black level compensation, shadow correction of the lens 1412, etc. The control logic 1450 may include a processor and/or microcontroller that performs one or more routines (e.g., firmware) that may determine control parameters of the imaging device 1410 and ISP processor 1440, based on received statistics. For example, the control parameters of the imaging device 1410 may include control parameters of the sensor 1420 (e.g., gain, integration time of exposure control, anti-shake parameters, etc.), flash control parameters, of the camera, control parameters of the lens 1412 (e.g., focus or zoom focus), or a combination of these parameters. The ISP control parameters may include gain level s and color correction matrices for automatic white balance and color adjustment (e.g., during RGB processing), and shadow correction parameters of the lens 1412.

Any references to memory, storage, databases, or other media used in this application may include a non-transitory memory and/or transitory memory. The suitable non-transitory memory may include read only memory (ROM), programmable ROM (PROM), electrically programmable ROM (EPROM), electrically erasable programmable ROM (EEPROM), or flash memory. The transitory memory may include a random access memory (RAM), which is served as an external cache memory. By way of illustration but not limitation, RAM is available in various forms, such as static RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), memory bus direct RAM (RDRAM), direct memory bus dynamic RAM (DRDRAM), and memory bus dynamic RAM (RDRAM).

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A method for image processing, comprising:
   obtaining an image to be detected, and inputting the image to be detected to a neural network;
   detecting the image to be detected via the neural network to obtain confidence levels of image categories for a background image in the image and confidence levels of object categories for a foreground target in the image;
   determining an image category of the background image according to the confidence levels of the image categories for the background image and a confidence level threshold; and
   determining an object category of the foreground target according to the confidence levels of the object categories for the foreground target and the confidence level threshold;
   wherein the neural network comprises at least one input layer, at least one base layer, at least one classification layer, and at least one target detection layer; wherein the input layer is cascaded to the base layer, and the base layer is cascaded to the classification layer and the target detection layer;
   wherein inputting the image to be detected to the neural network comprises: inputting the image to be detected to the input layer of the neural network; and
   wherein detecting the image to be detected via the neural network to obtain confidence levels of image categories for the background image in the image and confidence levels of object categories for the foreground target in the image comprises:
      extracting one or more features of the image to be detected via the base layer of the neural network, and inputting the one or more extracted image features to the classification layer and the target detection layer;
      performing category detection on the background image in the image at the classification layer to obtain the confidence levels of the image categories for the background image; and
      performing target detection on the foreground target in the image at the target detection layer to obtain the confidence levels of the object categories for the foreground target.

2. The method according to claim 1, wherein the neural network further comprises a first output layer cascaded to the classification layer and a second output layer cascaded to the target detection layer; and
   the method further comprises:
      outputting by the first output layer the confidence levels of the image categories for the background image; and
      outputting by the second output layer the confidence levels of the object categories for the foreground target.

3. The method according to claim 2, further comprising: inputting a training image pre-labeled with an image category and an object category to the neural network to train the neural network.

4. The method according to claim 3, wherein inputting the training image pre-labeled with the image category and the object category to the neural network to train the neural network comprises:
   inputting the training image to the input layer of the neural network;
   extracting one or more features of the training image via the base layer and inputting the one or more extracted image features to the classification layer and the target detection layer;
   obtaining a first loss function at the classification layer, wherein the first loss function indicates a difference between a first predicted confidence level and a first true confidence level, the first predicted confidence level is a confidence level, which is predicted by the neural network, of an image category of a background image in the training image, and the first true confidence level is a true confidence level of the image category pre-labeled in the training image;
   obtaining a second loss function at the target detection layer, wherein, the second loss function indicates a difference between a second predicted confidence level and a second true confidence level, the second predicted confidence level is a confidence level, which is predicted by the neural network, of an object category of a foreground target in the training image, and the second true confidence level is a true confidence level of the object category pre-labeled in the training image;
   calculating a weighted summation of the first loss function and the second loss function to obtain a target loss function; and
   adjusting one or more parameters of the neural network according to the target loss function to minimize the first loss function and the second loss function.

5. The method according to claim 1, further comprising: performing the target detection on the foreground target in the image at the target detection layer to obtain a position of the foreground target.

6. The method according to claim 2, further comprising: inputting a training image pre-labeled with an image category, an object category and a true boundary box corresponding to the object category to the neural network to train the neural network.

7. The method according to claim 6, wherein inputting a training image pre-labeled with an image category, an object category and a true boundary box corresponding to the object category to the neural network to train the neural network comprises:
- inputting the training image to the input layer of the neural network;
- extracting one or more features of the training image via the base layer, and inputting the one or more extracted image features to the classification layer and the target detection layer;
- obtaining a first loss function at the classification layer, wherein the first loss function indicates a difference between a first predicted confidence level and a first true confidence level; the first predicted confidence level is a confidence level, which is predicted by the neural network, of an image category of a background image in the training image, and the first true confidence level is a true confidence level of the image category pre-labeled in the training image;
- obtaining a second loss function and a position loss function at the target detection layer, wherein the second loss function indicates a difference between a second predicted confidence level and a second true confidence level, the second predicted confidence level is a confidence level, which is predicted by the neural network, of an object category of a foreground target in the training image, and the second true confidence level is a true confidence level of the object category pre-labeled in the training image; the position loss function is constructed according to offset parameters of each pre-selected default boundary box relative to a true boundary box corresponding to the object category;
- calculating a weighted summation of the first loss function, the second loss function and the position loss function to obtain a target loss function; and
- adjusting one or more parameters of the neural network according to the target loss function to minimize the first loss function, the second loss function, and the position loss function.

8. The method according to claim 7, wherein the offset parameters of each pre-selected default boundary box relative to the true boundary box corresponding to the object category comprises: coordinates of a center point of the default boundary box, a width offset of the default boundary box relative to the true boundary box, and a height offset of the default boundary box relative to the true boundary box.

9. The method according to claim 7, further comprising: outputting by the second output layer the offset parameters of each pre-selected default boundary box relative to the true boundary box corresponding to the object category.

10. The method according to claim 2, wherein the base layer comprises a Visual Geometry Group (VGG) network, the classification layer comprises a Mobilenet layer, the target detection layer comprises a Single Shot Multibox Detector (SSD) network, and the first output layer and the second output layer respectively comprise a softmax classifier.

11. The method according to claim 1, further comprising:
- constructing a neural network comprising a first branch and a second branch;
- configuring the first branch to output confidence levels, which are detected by the neural network, of the image categories for the background image; and
- configuring the second branch to output confidence levels, which are detected by the neural network, of the object categories for the foreground target, or configuring the second branch to output confidence levels, which are detected by the neural network, of the object categories for the foreground target and offset parameters, which are detected by the neural network, of each pre-selected default boundary box relative to a true boundary box corresponding to an object category.

12. An electronic device, the electronic device comprising a processor and a memory storing a computer program that is executable by the processor to perform actions of:
- obtaining an image to be detected, and inputting the image to be detected to a neural network;
- detecting the image to be detected via the neural network to obtain confidence levels of image categories for a background image in the image and confidence levels of object categories for a foreground target in the image;
- determining an image category of the background image according to the confidence levels of the image categories for the background image and a confidence level threshold; and
- determining an object category of the foreground target according to the confidence levels of the object categories for the foreground target and the confidence level threshold;
- wherein the neural network comprises at least one input layer, at least one base layer, at least one classification layer, and at least one target detection layer; wherein the input layer is cascaded to the base layer, and the base layer is cascaded to the classification layer and the target detection layer;
- wherein inputting the image to be detected to the neural network comprises: inputting the image to be detected to the input layer of the neural network; and
- wherein detecting the image to be detected via the neural network to obtain confidence levels of image categories for the background image in the image and confidence levels of object categories for the foreground target in the image comprises:
  - extracting one or more features of the image to be detected via the base layer of the neural network, and inputting the one or more extracted image features to the classification layer and the target detection layer;
  - performing category detection on the background image in the image at the classification layer to obtain the confidence levels of the image categories for the background image; and
  - performing target detection on the foreground target in the image at the target detection layer to obtain the confidence levels of the object categories for the foreground target.

13. The electronic device according to claim 12, wherein the neural network further comprises a first output layer connected to the classification layer and a second output layer connected to the target detection layer; and
- when the computer program is executed by the processor, the processor further performs actions of:
  - outputting at the first output layer the confidence levels of the image categories for the background image; and
  - outputting at the second output layer the confidence levels of the object categories for the foreground target.

14. The electronic device according to claim 13, wherein when the computer program is executed by the processor, the processor further performs actions of: inputting a training image pre-labeled with an image category and an object category to the neural network to train the neural network.

15. The electronic device according to claim 14, wherein inputting the training image pre-labeled with the image category and the object category to the neural network to train the neural network comprises:

inputting the training image to the input layer of the neural network;

extracting one or more features of the training image via the base layer and inputting the one or more extracted image features to the classification layer and the target detection layer;

obtaining a first loss function at the classification layer, wherein the first loss function indicates a difference between a first predicted confidence level and a first true confidence level, the first predicted confidence level is a confidence level, which is predicted by the neural network, of an image category of a background image in the training image, and the first true confidence level is a true confidence level of the image category pre-labeled in the training image;

obtaining a second loss function at the target detection layer, wherein, the second loss function indicates a difference between a second predicted confidence level and a second true confidence level, the second predicted confidence level is a confidence level, which is predicted by the neural network, of an object category of a foreground target in the training image, and the second true confidence level is a true confidence level of the object category pre-labeled in the training image;

calculating a weighted summation of the first loss function and the second loss function to obtain a target loss function; and adjusting one or more parameters of the neural network according to the target loss function to minimize the first loss function and the second loss function.

16. The electronic device according to claim 13, wherein, when the computer program is executed by the processor, the processor further performs actions of: inputting a training image pre-labeled with an image category, an object category and a true boundary box corresponding to the object category to the neural network to train the neural network.

17. The electronic device according to claim 16, wherein inputting a training image pre-labeled with an image category, an object category and a true boundary box corresponding to the object category to the neural network to train the neural network comprises:

inputting the training image to the input layer of the neural network;

extracting one or more features of the training image via the base layer, and inputting the one or more extracted image features to the classification layer and the target detection layer;

obtaining a first loss function at the classification layer, wherein the first loss function indicates a difference between a first predicted confidence level and a first true confidence level;

the first predicted confidence level is a confidence level, which is predicted by the neural network, of an image category of a background image in the training image, and the first true confidence level is a true confidence level of the image category pre-labeled in the training image;

obtaining a second loss function and a position loss function at the target detection layer, wherein the second loss function indicates a difference between a second predicted confidence level and a second true confidence level, the second predicted confidence level is a confidence level, which is predicted by the neural network, of an object category of a foreground target in the training image, and the second true confidence level is a true confidence level of the object category pre-labeled in the training image; the position loss function is constructed according to offset parameters of each pre-selected default boundary box relative to a true boundary box corresponding to the object category;

calculating a weighted summation of the first loss function, the second loss function and the position loss function to obtain a target loss function; and adjusting one or more parameters of the neural network according to the target loss function to minimize the first loss function, the second loss function, and the position loss function.

18. A non-transitory computer readable storage medium having stored thereon a computer program that is executable by a processor to perform actions of:

obtaining an image to be detected, and inputting the image to be detected to a neural network;

detecting the image to be detected via the neural network to obtain confidence levels of image categories for a background image in the image and confidence levels of object categories for a foreground target in the image;

determining an image category of the background image according to the confidence levels of the image categories for the background image and a confidence level threshold; and determining an object category of the foreground target according to the confidence levels of the object categories for the foreground target and the confidence level threshold;

wherein the neural network comprises at least one input layer, at least one base layer, at least one classification layer, and at least one target detection layer; wherein, the input layer is cascaded to the base layer, and the base layer is cascaded to the classification layer and the target detection layer;

wherein inputting the image to be detected to the neural network comprises: inputting the image to be detected to the input layer of the neural network; and wherein detecting the image to be detected via the neural network to obtain confidence levels of image categories for the background image in the image and confidence levels of object categories for the foreground target in the image comprises:

extracting one or more features of the image to be detected via the base layer of the neural network, and inputting the one or more extracted image features to the classification layer and the target detection layer;

performing category detection on the background image in the image at the classification layer to obtain the confidence levels of the image categories for the background image; and performing target detection on the foreground target in the image at the target detection layer to obtain the confidence levels of the object categories for the foreground target.

* * * * *